(12) United States Patent
Siemens et al.

(10) Patent No.: US 11,405,311 B2
(45) Date of Patent: Aug. 2, 2022

(54) RECOVERING AND RECONCILING HIERARCHICAL FORWARDING EQUIVALENCE CLASS INFORMATION

(71) Applicant: Arista Networks, Inc., Santa Clara, CA (US)

(72) Inventors: Trevor Siemens, Coquitlam (CA); Mayukh Saubhasik, Richmond (CA); Vahab Akbarzadeh, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 65 days.

(21) Appl. No.: 16/921,648

(22) Filed: Jul. 6, 2020

(65) Prior Publication Data

US 2022/0006732 A1 Jan. 6, 2022

(51) Int. Cl.
*H04L 45/48* (2022.01)
*H04L 49/00* (2022.01)
*H04L 45/50* (2022.01)
*H04L 45/00* (2022.01)
*H04L 45/02* (2022.01)

(52) U.S. Cl.
CPC ............. *H04L 45/48* (2013.01); *H04L 45/04* (2013.01); *H04L 45/50* (2013.01); *H04L 49/3009* (2013.01)

(58) Field of Classification Search
CPC ......... H04L 45/48; H04L 45/50; H04L 45/04; H04L 49/3009
See application file for complete search history.

(56) References Cited

U.S. PATENT DOCUMENTS

2017/0264552 A1* 9/2017 Duda ................. H04L 61/6022

* cited by examiner

*Primary Examiner* — Jianye Wu
(74) *Attorney, Agent, or Firm* — Fountainhead Law Group P.C.

(57) ABSTRACT

Recovering and reconciling hierarchical forwarding equivalence class information includes storing routing information in a forwarding information base (FIB) corresponding to a first hierarchy of nodes; storing routing information in a routing table separate from the FIB corresponding to a second hierarchy of nodes; and comparing routing information stored for a candidate node in the first hierarchy of nodes with routing information stored for a first plurality of nodes in the second hierarchy of nodes having a height that is the same as a height of the candidate node. Routing information corresponding to the routing information stored for the candidate node is removed from the FIB when the routing information stored for the candidate node does not match any of the routing information stored among the first plurality of nodes.

20 Claims, 10 Drawing Sheets

| DESTINATION | RULE |
|---|---|
| 192.168.1.0/24 | HW FEC 1 |
| 192.168.2.0/24 | HW FEC 1 |
| LABEL 1000 | HW FEC 2 |
| HW FEC 1 | HW FEC 3 |
| HW FEC 2 | HW FEC 4 |
| HW FEC 3 | ECMP (HW FEC 5, HW FEC 6) |
| HW FEC 4 | HW FEC 6 |
| HW FEC 5 | NEXT HOP 192.168.1.0, ETHERNET 1, MAC ADDR1 |
| HW FEC 6 | NEXT HOP 192.168.2.0, ETHERNET 2, MAC ADDR2 |

| DESTINATION | RULE |
|---|---|
| 192.168.1.0/24 | SW FEC 101 |
| 192.168.2.0/24 | SW FEC 101 |
| LABEL 1000 | SW FEC 102 |
| SW FEC 101 | SW FEC 103 |
| SW FEC 102 | SW FEC 104 |
| SW FEC 103 | ECMP (SW FEC 105, SW FEC 106) |
| SW FEC 104 | SW FEC 106 |
| SW FEC 105 | NEXT HOP 192.168.1.0, ETHERNET 1, MAC ADDR1 |
| SW FEC 106 | NEXT HOP 192.168.2.0, ETHERNET 2, MAC ADDR2 |

RECOVERING AND RECONCILING HIERARCHICAL FORWARDING EQUIVALENCE CLASS INFORMATION

BACKGROUND

Packet forwarding in a network switch involves the determination of a next hop device for a received network packet to which the packet is transmitted to forward the packet to its destination in the network. Packet forwarding uses dynamically obtained forwarding information to prepare the received packet for transmission to the next hop device. These updates are received in the control plane of the switch and maintained in a forwarding table also in the control plane. A program running in the control plane—using the forwarding table in the control plane—updates a version of the forwarding table that is maintained in the data plane.

When the program is restarted, the two forwarding tables can get out of sync. The forwarding table in the data plane may become out of date, because the program does not update it during the restart. Once the program is back up, the forwarding table in the data plane can be reprogrammed from scratch with the information in the control plane's forwarding table. The network switch does not forward packets during the reprogramming and packets may be dropped, though. Synchronizing the two forwarding tables after the program restarts should be conducted in a manner that reduces the impact to network traffic.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2A illustrates an example combination of a simplified forwarding information base and a simplified label forwarding information base.

FIG. 3A illustrates an example combination of a simplified hardware forwarding information base and a simplified hardware label forwarding information base.

DETAILED DESCRIPTION

Overview

A network switch or router can store routing information—how to process and forward incoming packets—in the control plane and data plane (also referred to as the forwarding plane). The control plane may maintain routing information, such as in an Internet Protocol (IP) routing table and/or label information base. The control plane, using a software agent, may further provide routing information to the data plane. In a Multiprotocol Label Switching (MPLS) configuration, for example, the control plane may populate (program) tables in the data plane, such as the hardware forwarding information base (HW FIB) (also referred to as an IP forwarding table) and/or hardware label forwarding information base (HW LFIB).

During the course of operation, the software agent may be restarted, or the network switch may be rebooted. To ensure that the routing information in the data plane is consistent with the control plane, the data plane may be entirely reprogrammed. During reprogramming, packets may be dropped or delayed by the network switch as the forwarding tables are repopulated. In accordance with the present disclosure, the routing information in the control plane and data plane can be compared so that only differences are programmed into the data plane, thus reducing programming time and hence the impact on network traffic.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 1A:
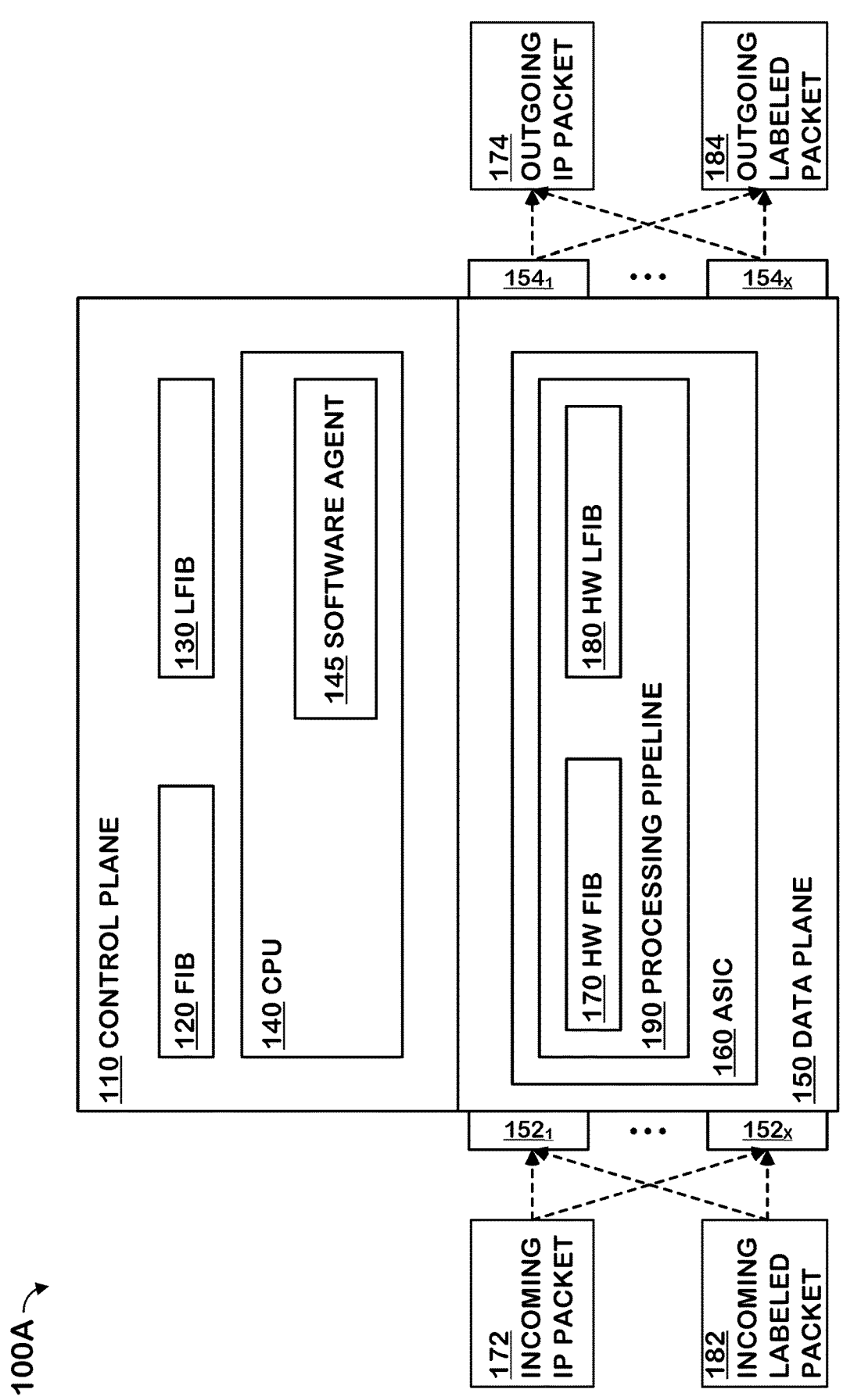
FIG. 1A illustrates an example system block diagram.

FIG. 1A illustrates example network switch (or router) 100A in accordance with the present disclosure. Network switch 100A includes control plane 110 and data plane 150 (sometimes referred to as a forwarding plane). Control plane 110 exchanges network topology information with other switches and constructs routing tables (e.g., forwarding information base (FIB) 120 (also referred to as an IP forwarding table) and, in the case of MPLS, label forwarding information base (LFIB) 130) using a suitable routing protocol. Routing protocols may be a software mechanism by which network switches and routers communicate and share information about the topology of the network, and the capabilities of each routing node. Routing protocols may include Enhanced Interior Gateway Routing Protocol (EIGRP), Routing Information Protocol (RIP), Open Shortest Path First (OSPF), Border Gateway Protocol (BGP), Label Distribution Protocol (LDP), and the like.

FIB 120 is a data structure which stores information that is used to determine where data packets traveling over an IP network will be directed. For example, FIB 120 may include routing information for sending incoming (ingress) IP packet 172 to the next hop on its route across the network as outgoing (egress) IP packet 174.

In contrast to IP packet forwarding, Multiprotocol Label Switching (MPLS) directs data from one node to the next based on short path labels rather than long network addresses, to avoid complex lookups in a routing table (e.g., FIB 120) and thus speed traffic flows. The labels identify virtual links (paths) between distant nodes rather than endpoints. So instead of forwarding a packet based on its IP routing information, MPLS packets are forwarded based on information associated with their labels. Moreover, in IP packet forwarding there is no fixed path that an IP packet must follow, wherein in MPLS forwarding the path is predefined. LFIB 130 is a data structure which may store destinations and incoming labels, and their associated outgoing interfaces and labels, for MPLS. For example, incoming labeled packet 182 is forwarded as outgoing labeled packet 184 to the next hop on the MPLS tunnel based on information in LFIB 130. Although MPLS is described in the following illustrative examples, it will be appreciated that the present disclosure is not specific to MPLS routes and is applicable to other match criteria, such as IP or IPv6 routes.

Control plane 110 includes central processing unit (CPU) 140. CPU 140 is described further in relation to FIG. 5. Among other processes, CPU 140 may run software agent 145. Software agent 145 is a computer program. Using routing information stored in FIB 120 and LFIB 130, software agent 145 can program forwarding tables (e.g., hardware forwarding information base (HW FIB) 170 and hardware label forwarding information base (HW LFIB) 180, respectively) using a software development kit (SDK), application programming interface (API), and the like for application specific integrated circuit (ASIC) 160. HW FIB 170 may also be referred to as a forwarding table or media access control address (MAC) table.

HW FIB 170 is conceptually similar to FIB 120, and likewise HW LFIB 180 is conceptually similar to LFIB 130. HW FIB 170 and HW LFIB 180 can store the same forwarding information as contained in FIB 120 and LFIB 130, respectively. It will be appreciated, however, that the routing information in FIB 120 and HW FIB 170 can be formatted and organized differently in LFIB 130 and HW LFIB 180, respectively. Accordingly, routing information in FIB 120 and HW FIB 170 cannot be directly mapped to LFIB 130 and HW LFIB 180, and vice-versa.

When routing or topology changes occur in the network, FIB 120 is updated, and software agent 145 may program HW FIB 170 with the changes. When MPLS path changes occur in the network, LFIB 130 is updated, and software agent 145 may program HW LFIB 180 with the changes. In this way, a one-to-one correlation can be maintained between entries in FIB 120 and HW FIB 170, and between entries in LFIB 130 and HW LFIB 180.

As used herein, forwarding equivalence class (FEC) information informs how packets with similar characteristics are forwarded, for example, by forwarding the packets to the same next hop device such as a switch, router, etc. FEC information in FIB 120 and LFIB 130 in the control plane and in HW FIB 170 and HW LFIB 180 in the data plane may have a hierarchical structure. A hierarchy may result when a FEC in one entry in the table refers to another FEC or FECs in the table. For example, an incoming packet (e.g., incoming IP packet 172 or incoming labeled packet 182) may be associated with FEC 1 in HW FIB 170 or HW LFIB 180, FEC 1 information indicates that FEC 10 is to be followed, and FEC 10 information indicates the packet is to be egressed out of port Ethernet 1 (e.g., as outgoing IP packet 174 or outgoing labeled packet or IP packet 184). Here, the hierarchy is FEC 1 and FEC 10.

Real-time packet forwarding decisions are made by processing pipeline 190 using HW FIB 170 or HW LFIB 180. For example, incoming IP packet 172 or incoming labeled packet 182 may ingress switch 100A through one of ports $152_1$-$152_x$, enter processing pipeline 190 which determines an output port and next hop (e.g., based on traversing a hierarchical FEC in HW FIB 170 or HW LFIB 180), and egress switch 100A through one of ports $154_1$-$154_x$ as outgoing IP packet 174 or outgoing labeled packet or IP packet 184, respectively.

During the course of operation of switch 100A, software agent 145 may be reset/restarted. Alternatively, switch 100A may be rebooted, such as during a stateful switchover (SSO). During a reset or reboot, HW FIB 170 and HW LFIB 180 may not receive FEC information updates from software agent 145. When software agent 145 comes back up, it may reprogram HW FIB 170 and HW LFIB 180, so that they contain current FEC information stored in FIB 120 and LFIB 130. If HW FIB 170 and HW LFIB 180 are completely reprogrammed, switch 100A, the processing of incoming packets (e.g., incoming IP packet 172 or incoming labeled packet 182) can be impacted and data loss may result. However, HW FIB 170 and HW LFIB 180 may retain some or all the FEC information from before the reset and reboot. After restart or reboot, it would be advantageous to just program new FEC information in and remove invalid FEC information from HW FIB 170 and HW LFIB 180 to minimize reprogramming time and data loss, instead of reprogramming them entirely.

In the following non-limiting examples, IP and MPLS routes are used purely for illustrative purposes. The techniques described may be applied to other route types, such as IPv6, and the like. For example, a forest of trees graph could be constructed from FIB 120 and HW FIB 170 in FIG. 1A, and reconciled, as described below. As used herein, hierarchical FECs from the data plane are referred to as HW FECs, and hierarchical FECs from the control plane are referred to as SW FECs.

Graph Data Structure

Figure 1B:
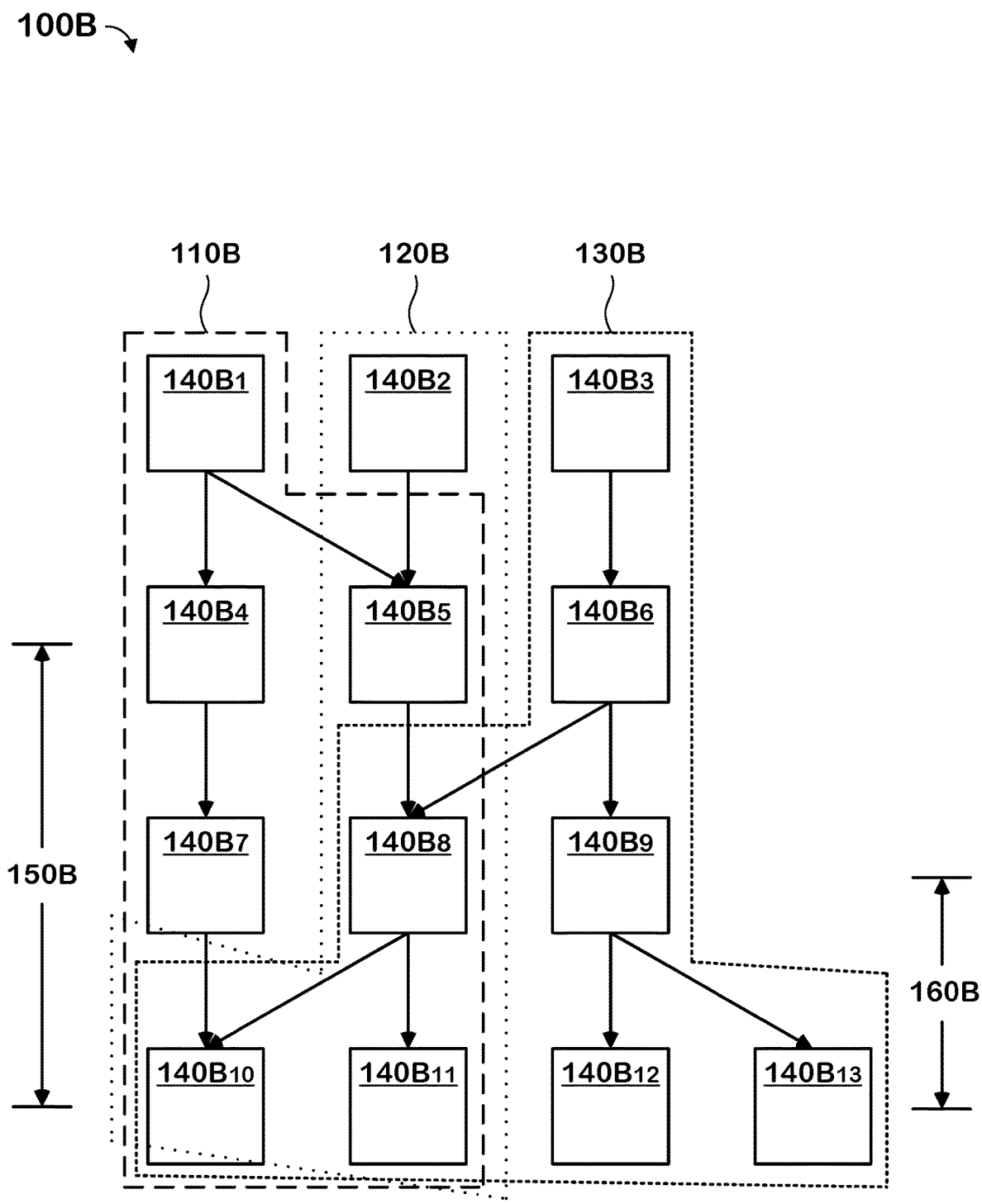
FIG. 1B illustrates an example graph.

FIG. 1B illustrates example graph (or forest or forest of trees) 100B that can be used to represent the hierarchical nature of HW FECs and SW FECs in accordance with some embodiments. Graph 100B includes trees 110B, 120B, and 130B. Tree 110B comprises nodes $140B_1$, $140B_4$, $140B_5$, $140B_7$, $140B_8$, $140B_{10}$, and $140B_{11}$. Tree 120B comprises nodes $140B_2$, $140B_5$, $140B_8$, $140B_{10}$, and $140B_{11}$. Tree 130B comprises nodes $140B_3$, $140B_6$, $140B_8$, $140B_9$, and $140B_{10}$-$140B_{13}$.

Each tree represents a route comprising combinations and permutations of nodes $140B_1$-$140_{13}$. Each node stores a rule (e.g., a HW FEC or a SW FEC) for how to route a packet. Rules may refer to other rules (which reflects the hierarchical nature of HW FECs and SW FECs), select another rule from among multiple other rules, indicate a port to egress from, and the like. The trees are "entered" at a root node and "exited" at a leaf node. Root nodes (e.g., root nodes $140B_1$, $140B_2$, and $140B_3$) at the top of graph 100B are nodes that are usually referenced by a route entry (e.g., an IP route, MPLS route, and the like). Root nodes may have one or more child nodes (e.g., child nodes $140B_4$-$140B_{13}$). In addition, a root node may also be a child node, such as when a node is both referenced by a route entry and has a parent node in a different tree. For example, one of child nodes $140B_4$-$140B_{13}$ could be the root of another tree when it is referenced by a route entry.

Parent nodes are nodes that are coupled to and immediately precede a child node. For example, node $140B_6$ is a parent node to nodes $140B_8$ and $140B_9$. Nodes may appear multiple times in a single tree and across different trees. For example, node $140B_8$ is in trees 110B, 120B, and 130B. Additionally, a node may be a child node of many different nodes and/or be the child of the same node multiple times (e.g., when a FEC is replicated, selected based on weighting, etc.). For example, node $140B_5$ is a child node of nodes $140_1$ and $140_2$. Leaf nodes (e.g., leaf nodes $140B_{10}$-$140B_{13}$) at the bottom of graph 100B typically indicate a port to egress from.

Each node can have a height. As used herein, "height" can be defined as the distance of the node from a leaf node of the respective tree. Height may also be thought of as the number of levels above the leaf node. Leaf nodes (e.g., leaf nodes $140B_{10}$-$140B_{13}$) have a height of zero. Nodes $140B_7$-$140B_9$ have a height 160B of 1. Nodes $140B_4$-$140B_6$ have a height 150B of 2. Additional example trees are provided in FIGS. 2B and 3B.

Example HW FECs and Graph

Figure 2B:
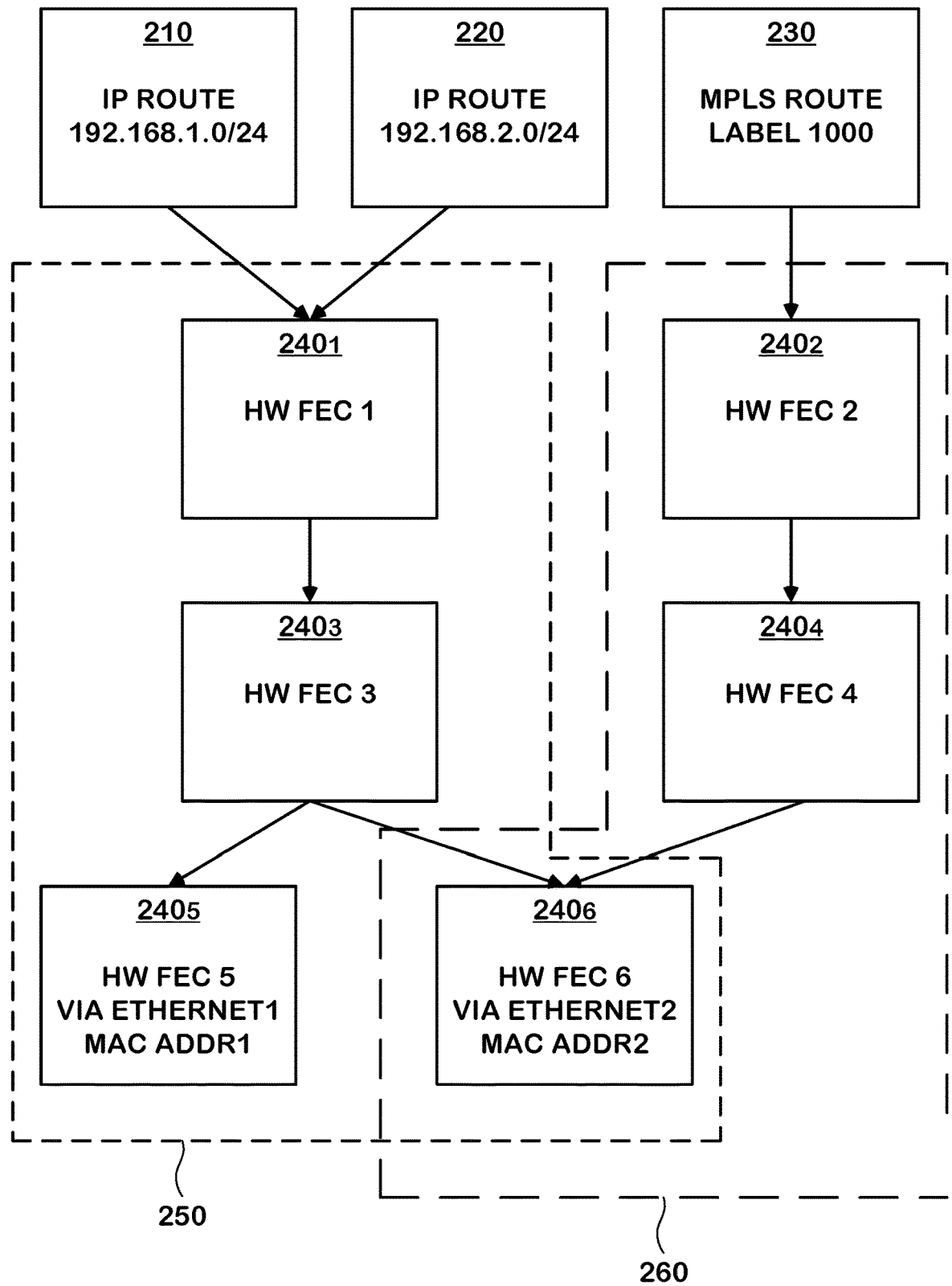
FIG. 2B illustrates an example of a HW FEC tree.

FIG. 2A illustrates example simplified routing table 200A—which is a combination of a hardware forwarding information base (e.g., HW FIB 170 in FIG. 1A) and hardware label forwarding information base (e.g., HW LFIB 180)—comprising hierarchical HW FEC information. According to some embodiments, hierarchical HW FEC information may be used to construct a graph, such as graph 200B in FIG. 2B. The hierarchical HW FEC information in routing table 200A is described further in relation to FIG. 2B.

FIG. 2B illustrates example HW FEC graph (or forest or forest of trees) 200B, in accordance with some embodiments. HW FEC graph 200B comprise HW FEC trees 250 and 260. HW FEC trees 250 and 260 represent hierarchical FEC information contained in the data plane (e.g., HW LFIB 180 in FIG. 1A), such as in routing table 200A (FIG. 2A). HW FEC tree 250 comprise nodes $240_1$, $240_3$, $240_5$, and $240_6$. HW FEC tree 260 comprise nodes $240_2$, $240_4$, and $240_6$. IP routes 210 and 220 are entry points to HW FEC tree 250. MPLS route 230 is an entry point to HW FEC tree 260. HW FEC 1 $240_1$ and HW FEC 2 $240_2$ are root nodes. HW FEC 3 $240_3$ through HW FEC 6 $240_6$ are child nodes. Examples of parent nodes include HW FEC 3 $240_3$ for HW FEC 5 $240_5$ and HW FEC 6 $240_6$, and HW FEC 4 $240_4$ for HW FEC 6 $240_6$. HW FEC 5 $240_5$ and HW FEC 6 $240_6$ are leaf nodes.

As shown in FIG. 2B, packets with a destination IP address of 192.168.1.0/24 in IP route 210 and a destination IP address of 192.168.2.0/24 in IP route 220 may use HW FEC 1 $240_1$ for their egress information. HW FEC 1 $240_1$ may use HW FEC 3 $240_3$ for its egress information. HW FEC 3 $240_3$ may use an equal cost multi-path routing (ECMP) between HW FEC 5 $240_5$ and HW FEC 6 $240_6$. ECMP is a routing strategy where packet forwarding to a single destination can occur over multiple "best paths" which tie for top place in routing metric calculations. HW FEC 5 $240_5$ egresses via port ETHERNET1 to MAC address MAC ADDR1 and HW FEC 6 $240_6$ egresses via port ETHERNET2 to MAC address MAC ADDR2. By way of further example, packets with MPLS label 1000 in MPLS route 230 use HW FEC 2 $240_2$ for their egress information. HW FEC 2 $240_2$ uses HW FEC 4 $240_4$ for its egress information. HW FEC 4 $240_4$ uses HW FEC 6 $240_6$ for its egress information.

Example SW FECs and Graph

Figure 3B:
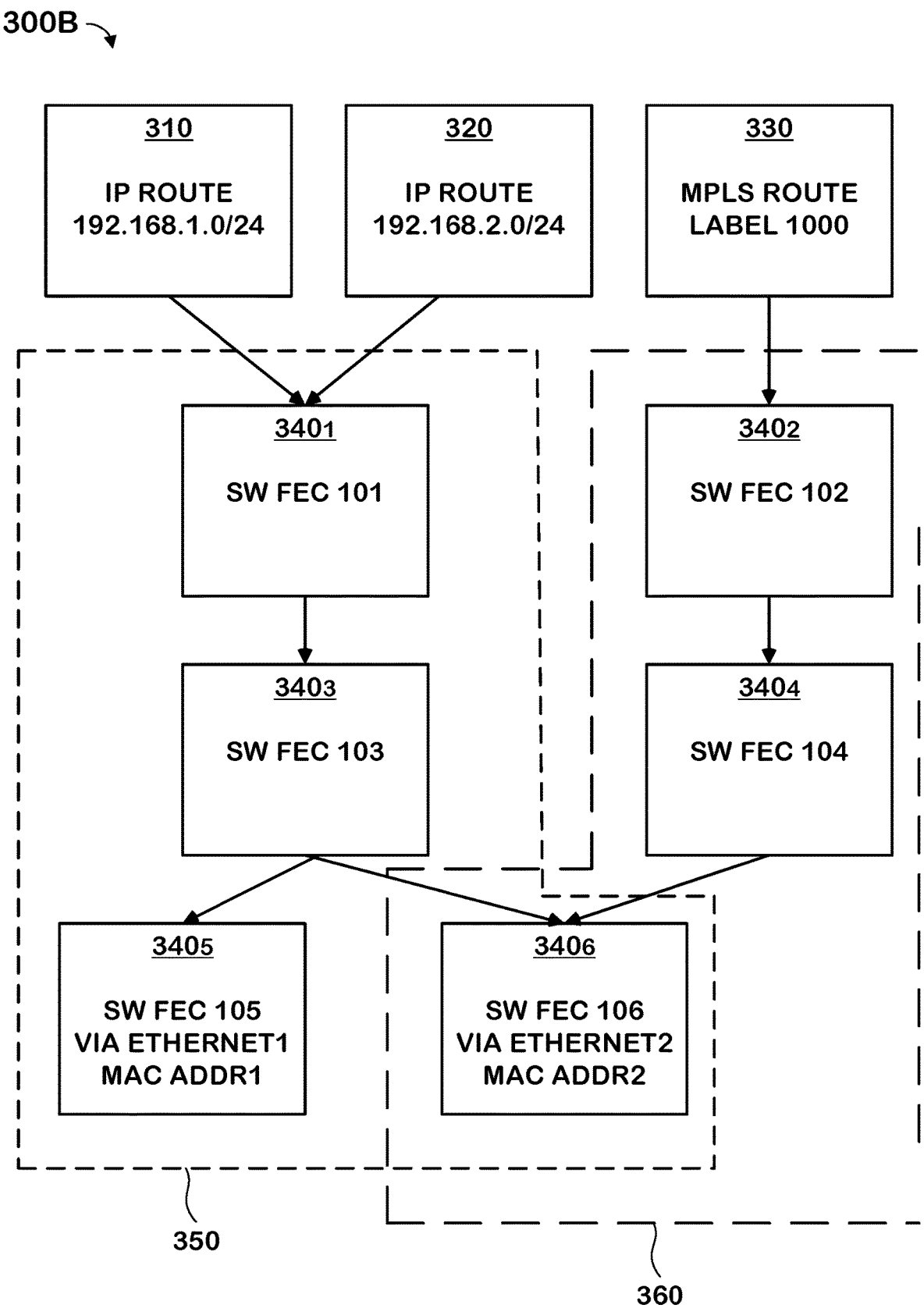
FIG. 3B illustrates an example of a SW FEC tree.

FIG. 3A illustrates example simplified routing table 300A—which is a combination of a forwarding information base (e.g., FIB 120 in FIG. 1A) and label forwarding information base (e.g., LFIB 130)—comprising hierarchical SW FEC information. According to some embodiments, hierarchical SW FEC information may be used to construct a graph, such as graph 300B in FIG. 3B. The hierarchical SW FEC information in routing table 300A is described further in relation to FIG. 3B. FIG. 3B illustrates example SW FEC graph (or forest or forest of trees) 300B, in accordance with various embodiments. SW FEC graph 300B comprise SW FEC trees 350 and 360. SW FEC trees 350 and 360 represent hierarchical FEC information contained in the control plane (e.g., LFIB 130 in FIG. 1A), such as in routing table 300A (FIG. 3A). SW FEC tree 350 comprise nodes $340_1$, $340_3$, $340_5$, and $340_6$. SW FEC tree 360 comprise nodes $340_2$, $340_4$, and $340_6$. IP routes 310 and 320 are entry points to SW FEC tree 350. MPLS route 330 is an entry point to SW FEC tree 360. SW FEC 101 $340_1$ and SW FEC 102 $340_2$ are root nodes. SW FEC 103 $340_3$ through SW FEC 106 $340_6$ are child nodes. Examples of parent nodes include SW FEC 103 $340_3$ for SW FEC 105 $340_5$ and SW FEC 106 $340_6$, and SW FEC 104 $340_4$ for SW FEC 106 $340_6$. SW FEC 105 $340_5$ and SW FEC 106 $340_6$ are leaf nodes.

As shown in FIG. 3B, packets with a destination IP address of 192.168.1.0/24 in IP route 310 and a destination IP address of 192.168.2.0/24 in IP route 320 may use SW FEC 101 $340_1$ for their egress information. SW FEC 101 $340_1$ may use SW FEC 103 $340_3$ for its egress information. SW FEC 103 $340_3$ may use an equal cost multi-path routing (ECMP) between SW FEC 105 $340_5$ and SW FEC 106 $340_6$. SW FEC 105 $340_5$ egresses via port ETHERNET1 to MAC address MAC ADDR1 and SW FEC 106 $340_6$ egresses via port ETHERNET2 to MAC address MAC ADDR2. By way of further example, packets with MPLS label 1000 in MPLS route 330 use SW FEC 102 $340_2$ for their egress information. SW FEC 102 $340_2$ uses SW FEC 104 $340_4$ for its egress information. SW FEC 104 $340_4$ uses SW FEC 106 $340_6$ for its egress information.

Generating and Reconciling Graphs

Figure 4A:
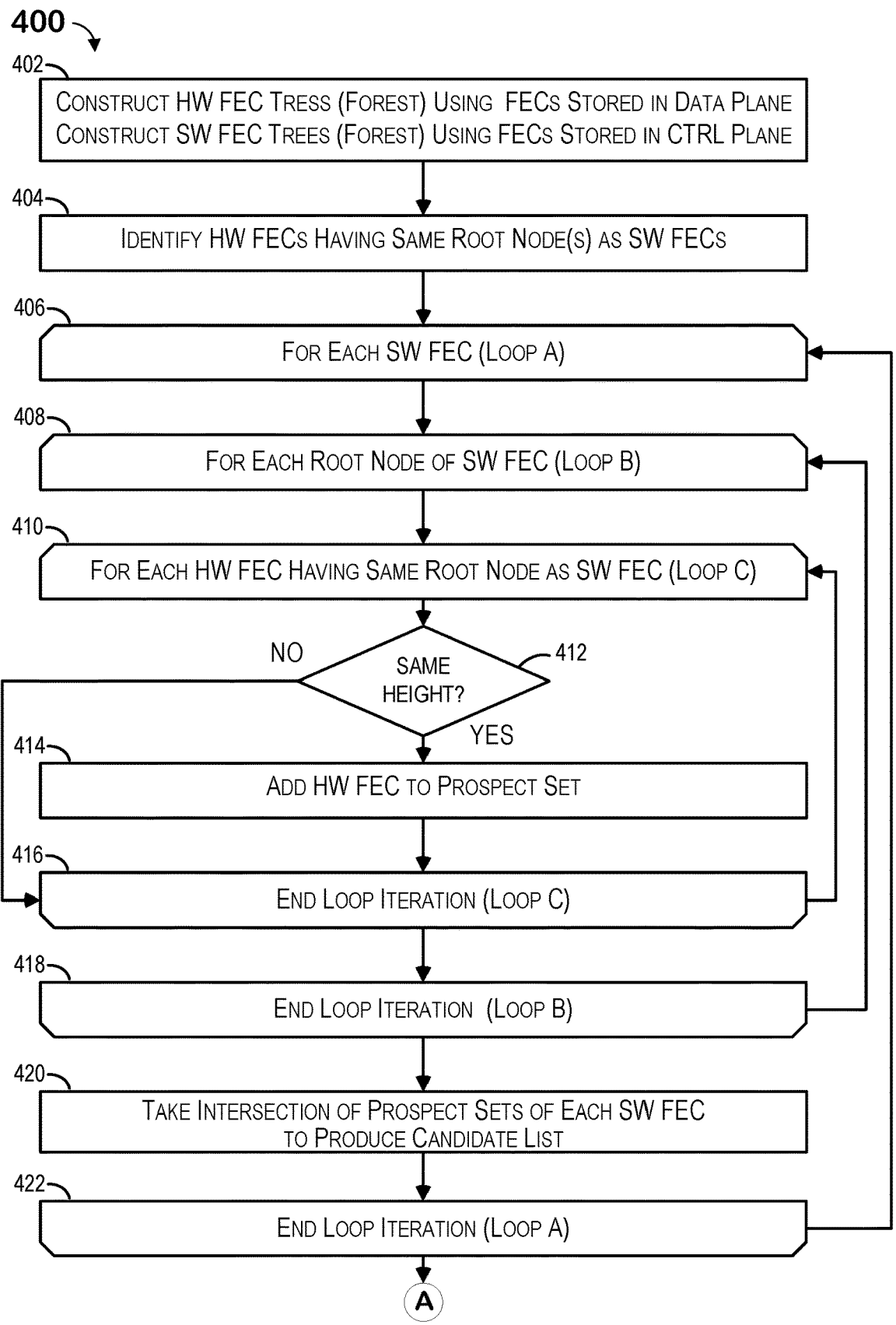
FIGS. 4A-4C illustrate a flow diagram of an example method for recovering and reconciling hierarchical forwarding equivalence class information.
Figure 4B:
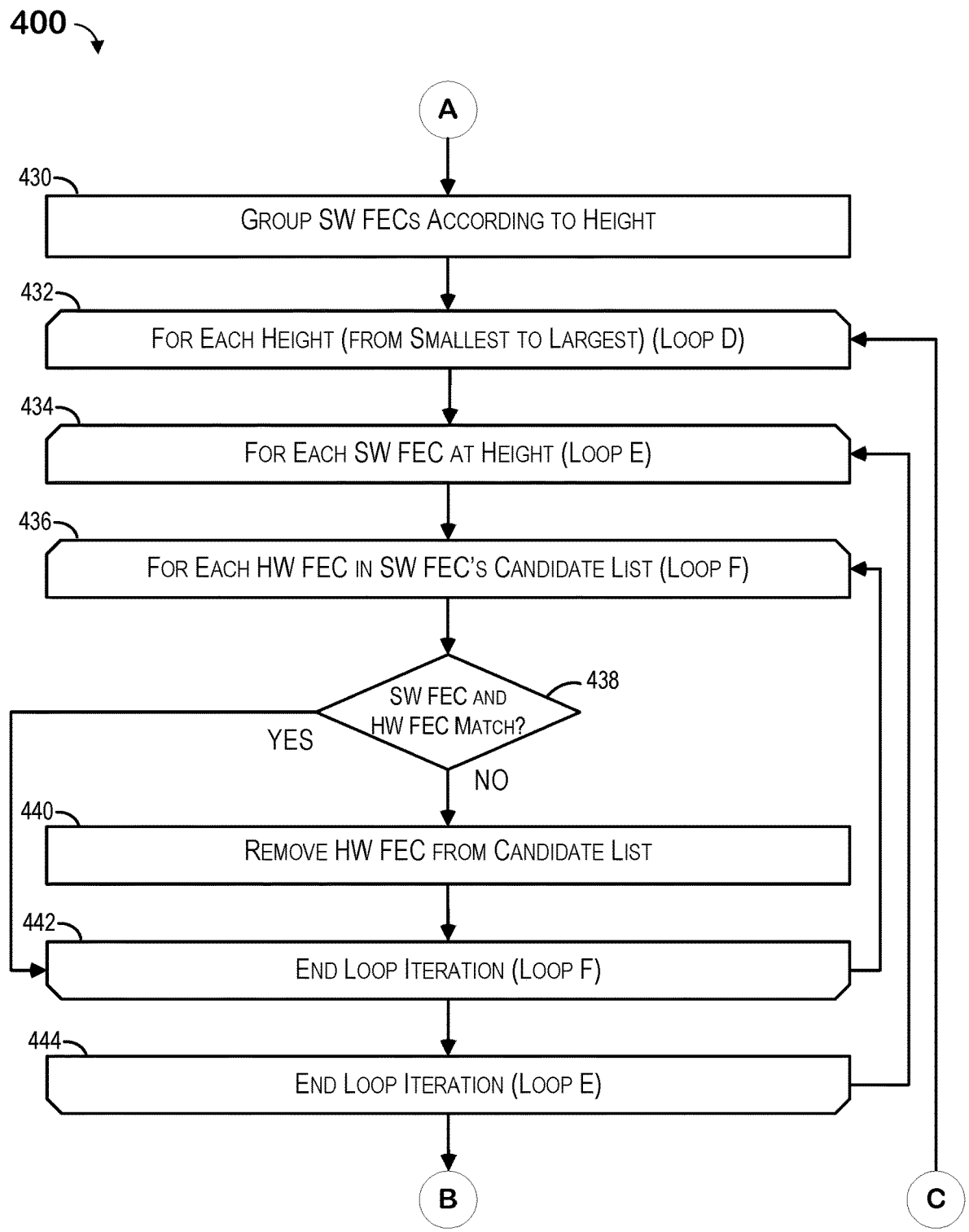
Figure 4C:
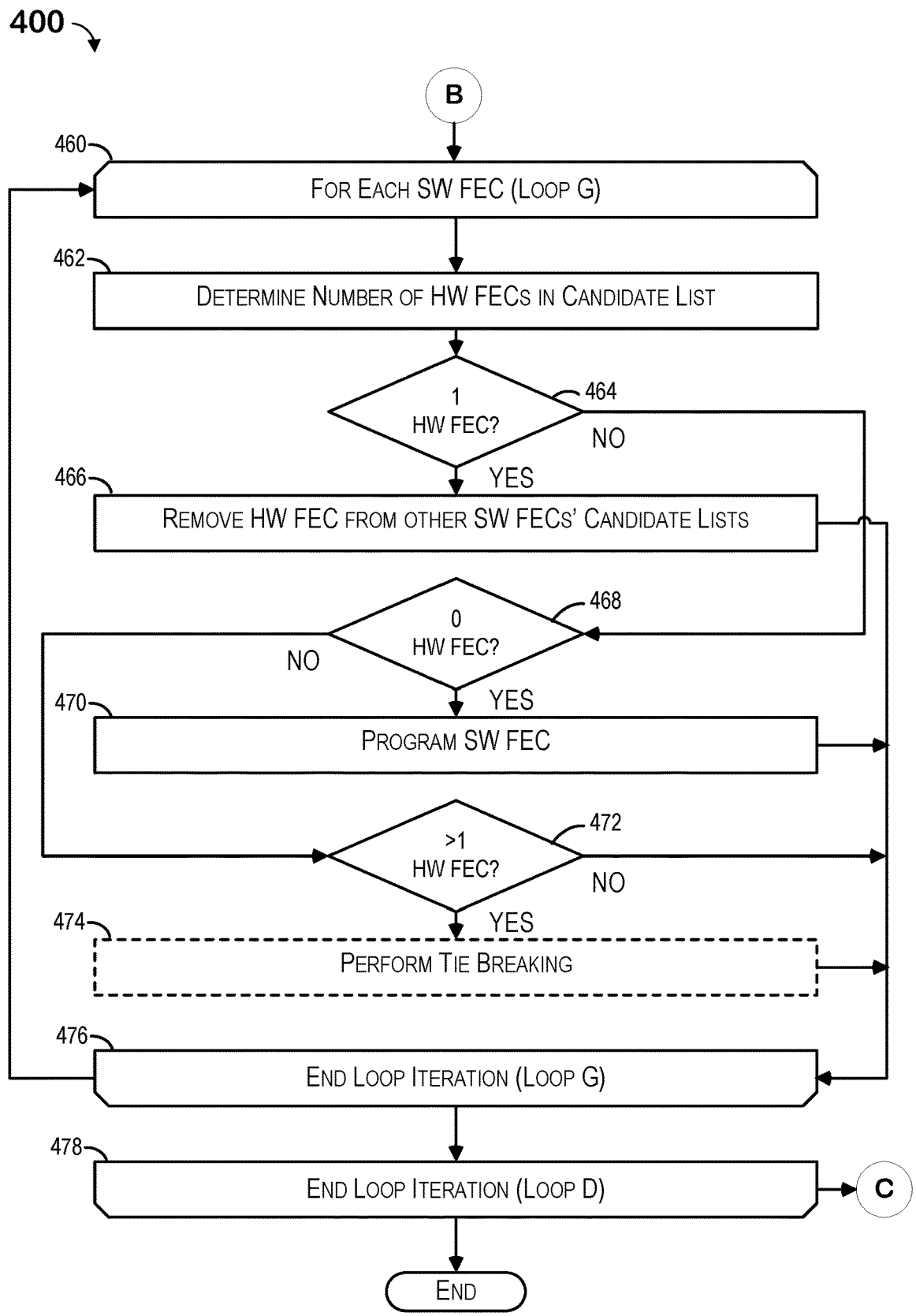

FIGS. 4A-C show method 400 for recovering and reconciling hierarchical FECs, according to various embodiments. Method 400 may be performed by (software agent 145 in) network switch 100A (FIG. 1A). For example, network switch 100A can include one or more digital processing units, which when operated, can cause the switch unit to perform processing in accordance with FIG. 4. Digital processing units can include general CPUs that operate by way of executing computer program code stored on a non-volatile computer readable storage medium (e.g., read-only memory, ROM 520); for example, processor(s) 502, FIG. 5 can be a general CPU. Digital processing units can include specialized processors such as digital signal processors (DSPs), graphics coprocessors, field programmable arrays, application specific integrated circuits (ASICs), etc. that operate by way of executing computer program code or operate by way of being configured for specific operations by program code. The flow of operations performed by the switch unit is not necessarily limited to the order of operations shown.

Method 400 may commence at step 402 in FIG. 4A, where the network switch can construct or otherwise generate a HW FEC forest of trees from HW FEC data stored in the data plane. For example, hierarchical FEC information may be obtained from HW LFIB 180 and used to construct the trees. An example of trees constructed at step 402 is provided in FIG. 2B. Note that non-hierarchical HW FECs (leaf node HW FECs with a height a of zero, where the tree comprises a root and a leaf) may also be recovered at step 402.

Also at step 402, the network switch can construct or otherwise generate a SW FEC forest of trees from FEC data stored in the control plane. For example, hierarchical SW FEC information may be obtained from LFIB 130 (FIG. 1A) and used to construct the trees. An example of trees constructed at step 402 is provided in FIG. 3B. Note that non-hierarchical SW FECs (leaf node SW FECs with a height of zero, where the tree comprises a root and a leaf) may also be recovered at step 402.

As noted above, the SW FEC information stored in the control plane (e.g., LFIB 130 in FIG. 1A) may be stored and/or organized differently from the HW FEC information in the data plane (e.g., HW LFIB 180). As such, identifiers for the FECs in the control plane may be different from identifiers used in the data plane. The FECs may be stored in different places in memory, and so on. However, to the extent that the FECs stored in the control plane are the same as the FECs programmed in the data plane, the hierarchical relationship between FECs in control plane should be the same as in the data plane. The forest of trees graph constructed for HW FECs and SW FECs (step 402) provide a common data representation from which SW FECs and HW FECs may be matched, compared, and associated, despite the fact that they are identified differently between the control plane and the data plane.

At step 404, the network switch can identify HW FECs having the same root node(s) as SW FECs, by comparing the forest of trees constructed for HW FECs and SW FECs (step 402). Although SW FECs may be stored and/or organized differently from the HW FECs, IP routes and MPLS routes still have consistent identities between the two, such as an IP prefix or MPLS label. For example, HW FEC 1 $240_1$ (FIG. 2B) matches SW FEC 101 $340_1$ (FIG. 3B), because they have the same entry points, IP routes with destination IP addresses of 192.168.1.0/24 and 192.168.2.0/24 (IP Routes 210 and 220, and IP Routes 310 and 320). HW FEC 2 $240_2$ matches SW FEC 102 $340_2$, because they have the same entry point, MPLS label 1000 (MPLS Route Label 1000 230 and MPLS Route Label 1000 330).

At step 406, the network switch may enter a loop (Loop A) for each SW FEC in the SW FEC forest of trees. Within Loop A the network switch may enter another loop (Loop B) for each root node of the SW FEC (step 408). Within Loop B the network switch may enter another loop (Loop C) for each HW FEC—identified at step 404—having the same root node as the SW FEC (step 410).

Within Loop C, the height of the HW FEC is compared to the height of the SW FEC (step 412). Height was described in FIG. 1B. The network processor adds a HW FEC having the same height as the SW FEC to a prospect set (step 414). The prospect set for a SW FEC may contain HW FECs having the same root node and the same height as the SW FEC.

After the HW FEC is added to the prospect set or when the HW FEC is a different height than the SW FEC, the network switch terminates the current Loop C iteration (step 416). Method 400 returns to the start of Loop C to process further HW FECs having the same root node. Once all the HW FECs have been processed, Loop C may end, the current loop B iteration may end (step 418), and method 400 may return to the start of Loop B to process further root nodes of the SW FEC. Once all the root nodes of the SW FEC have been processed, Loop B may end.

At step 420, the network processor takes the intersection of the prospect sets of the SW FEC to produce a candidate list for the SW FEC. Once Loop B is completed, there may be multiple prospect sets for a SW FEC. Each prospect set may have different members. For example, SW FEC 106 $340_6$ (FIG. 3B) will have two prospect sets: {HW FEC 5 $240_5$, HW FEC 6 $240_6$} and {HW FEC 6 $240_6$} (FIG. 2B). The intersection of these two prospect sets is candidate list comprising HW FEC 6 $240_6$.

The network switch terminates the current Loop A iteration (step 422) and returns to the start of Loop A to process further SW FECs. Once all the SW FECs in the SW FEC forest of trees have been processed, Loop A may end. Method 400 may proceed to step 430 in FIG. 4B (A).

At step 430, the network switch groups SW FECs in the SW FEC forest of trees by height. The result is groups of SW FECs, each group containing SW FECs that have the same height. For example, SW FEC 105 $340_5$ and SW FEC 106 $340_6$ are in one group (height 0); SW FEC 103 $340_3$ and SW FEC 104 $340_4$ are in another group (height 1); and so on.

At step 432, the network switch may enter a loop (Loop D) for each height from smallest (height 0) to largest. Processing the SW FECs from the lowest height to the highest height in Loop D is advantageous. The matching at step 438 for any SW FEC with a height greater than 0 is effective when each of the SW FECs below it have already been associated/matched with a single HW FEC candidate. For example, if the comparison between SW FEC 106 $340_6$ and HW FEC 6 $240_6$ failed such that SW FEC 106 $340_6$ has no HW FEC candidates, then the comparisons of SW FEC 103 $340_3$ and SW FEC 104 $340_4$ with their respective HW FEC candidates would also fail. The match failures would cascade up the hierarchy.

Within Loop D the network switch may enter another loop (Loop E) for each SW FEC in the group for the height (step 434). Withing Loop E the network switch may enter another loop (Loop F) for each HW FEC in the SW FEC's candidate list (step 436).

Within Loop F, the SW FEC and the HW FEC are matched using various criteria (step 438). Criteria may include weights associated with the SW and HW FECs, number of parent nodes the SW and HW FECs have, distance of the SW and HW FECs from their respective root nodes, order in which the SW and HW FECs were installed, and the like. Weights may be attributes assigned to the FECs by a protocol. In some embodiments, the weights may indicate how much relative traffic should be handled by a particular FEC, such as in unequal cost multipath (UCMP) routing. The network processor removes the HW FEC from the SW FEC's candidate list when the SW FEC and the HW FEC do not match (step 440).

After the HW FEC is removed the candidate list or the SW FEC and the HW FEC match, the network switch terminates the current Loop F iteration (step 442). Method 400 returns to the start of Loop F to process further HW FECs in the SW FEC's candidate list. Once all the HW FECs have been processed, Loop F may end. The network switch terminates the current Loop E iteration (step 444) and returns to the start of Loop E to process further SW FECs at the height. Once all of the SW FECs have been processed, Loop E may end and method 400 may proceed to step 460 in FIG. 4C (B).

At step 460, the network switch may enter a loop (Loop G) for each SW FEC in the SW FEC forest of trees. Note that the SW FEC trees are of a particular height since Loop G is nested in Loop D. Within Loop G the network switch may determine a number of HW FECs in the SW FEC's candidate list (step 462).

When the SW FEC has one HW FEC in its candidate list (step 464), the network processor may remove the HW FEC from other SW FECs' candidate lists (step 466), terminate the current Loop G iteration (step 476), and return to the start of Loop G to process the next SW FEC. Here, method 400 establishes a one-to-one correspondence between the SW FEC and the HW FEC. Otherwise (step 464), method 400 proceeds to step 468.

When the SW FEC has no HW FECs in its candidate list (step 468), the network processor may add the SW FEC into the data plane routing information (e.g., HW LFIB 180 in FIG. 1A), such as by programming ASIC 160 (step 470). Here, the SW FEC may not have been added to the data plane's routing information (e.g., LFIB 130) while agent 145 was restarting. The network processor then terminates the current Loop G iteration (step 476), and returns to the start of Loop G to process the next SW FEC. Otherwise (step 468), method 400 proceeds to step 472.

When the SW FEC has more than one HW FEC in its candidate list (step 472), the network processor may optionally perform tie breaking among the multiple HW FECs (step 474). One tie breaking strategy may be to randomly select one HW FEC in the candidate list to associate with the SW FEC (and then go to step 476). Another tie breaking strategy may be to apply one or more matching criteria not used in the earlier matching (step 438) for another round of comparisons with the remaining HW FEC candidates. For example, if weights were not used in the earlier comparisons, then comparison with the remaining HW FEC candidates may be performed for tie breaking. Other tie breaking strategies may be used.

It will be appreciated that although decision steps 464, 468, and 472 are represented in a particular serial order, they can be in various serial orders and some steps performed concurrently. In addition, two of decision steps 464, 468, and 472 may be performed and one omitted. By way of non-limiting example, when decision steps 464 and 468 are not true, decision step 472 may be implicitly true, and method 400 may proceed to optional step 474.

The network processor then terminates the current Loop G iteration (step 476), and returns to the start of Loop G to process the next SW FEC. Once all of the SW FECs in the SW FEC forest of tress have been processed, the network switch terminates the current Loop D iteration (step 478) and returns to the start of Loop D to process the next height. Once all of the heights have been processed, Loop D may end and method 400 may end.

Embodiments of the present technology use graphs as a common data structure to represent SW FECs and HW FECs. The graphs are reconciled to match HW FECs to SW FECs. Where one HW FEC matches one SW FEC, the HW FEC is up to date in the data plane (and no programming is needed). Where a SW FEC does not match a HW FEC, the routing information in the data plane is out of date and the SW FEC is programmed into the data plane. Where a HW FEC does not match a SW FEC, the routing information in the data plane is out of date and the HW FEC is removed from the routing information in the data plane. In the ideal case, no programming is needed. The methods described above limit the amount of programming needed to bring the data plane routing information up to date after the agent is restarted. The impact on traffic through the network switch is advantageously minimized in this way.

Computing System

Figure 5:
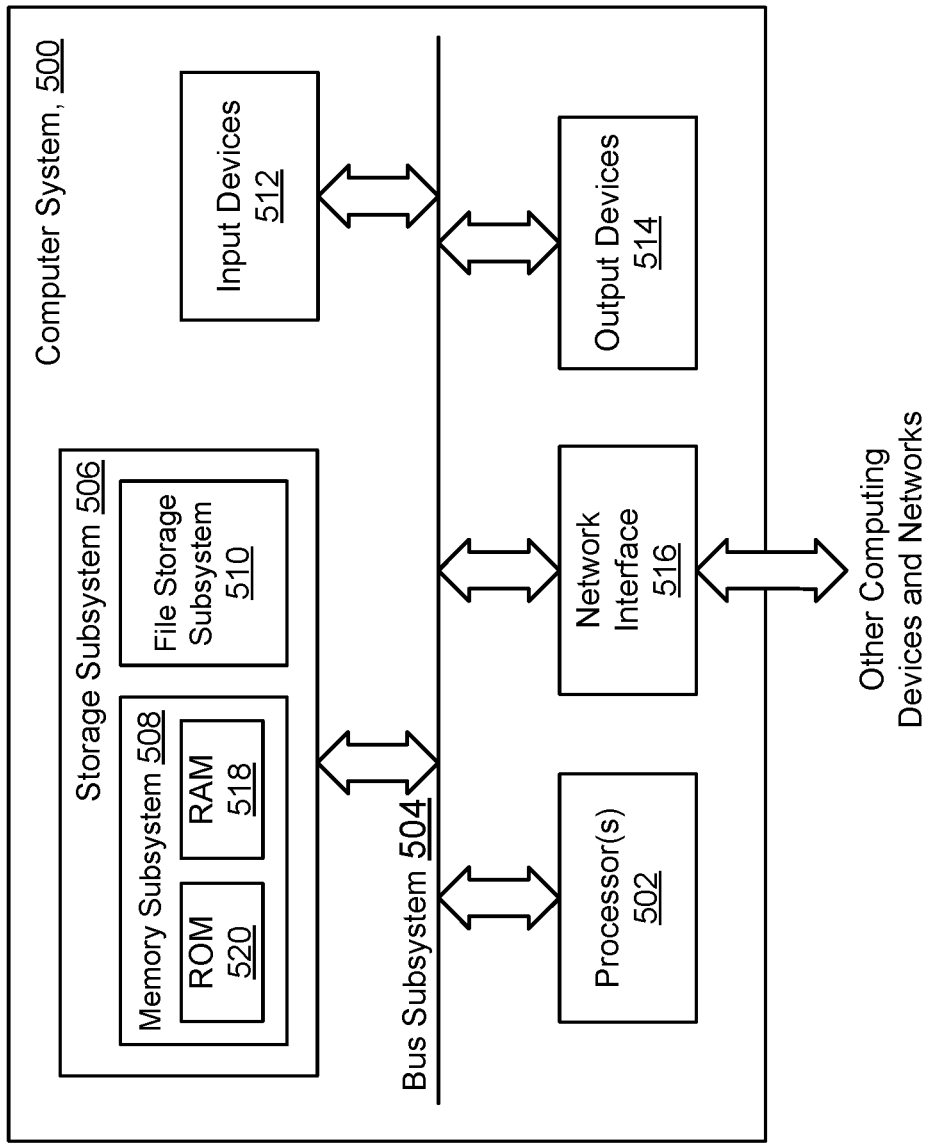
FIG. 5 shows an illustrative example of a computer system that can be adapted in accordance with the present disclosure.

FIG. 5 depicts a simplified block diagram of an example computer system 500 according to certain embodiments. Computer system 500 can be used to implement parts of switch 100A, such as FIB 120, LFIB 130, CPU 140, and software agent 145 described in the present disclosure. As shown in FIG. 5, computer system 500 includes one or more processors 502 that communicate with a number of peripheral devices via bus subsystem 504. These peripheral devices include storage subsystem 506 (comprising memory subsystem 508 and file storage subsystem 510), user interface input devices 512, user interface output devices 514, and network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., an Ethernet card, a Wi-Fi and/or cellular adapter, a modem (telephone, satellite, cable, ISDN, etc.), digital subscriber line (DSL) units, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 500.

User interface output devices 514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 500.

Memory subsystem 506 includes memory subsystem 508 and file/disk storage subsystem 510 represent non-transitory computer-readable storage media that can store program code and/or data, which when executed by processor 502, can cause processor 502 to perform operations in accordance with embodiments of the present disclosure.

Memory subsystem 508 includes a number of memories including main random-access memory (RAM) 518 for storage of instructions and data during program execution and read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

EXAMPLES

In accordance with some embodiments, a method can include 1 storing routing information in a forwarding information base (FIB) corresponding to a first hierarchy of nodes; storing routing information in a routing table separate from the FIB corresponding to a second hierarchy of nodes; comparing routing information stored for a candidate node in the first hierarchy of nodes with routing information stored for a first plurality of nodes in the second hierarchy of nodes having a height in the second hierarchy of nodes that is the same as a height of the candidate node in the first hierarchy of nodes; and removing routing information from the FIB that corresponds to the routing information stored for the candidate node when the routing information stored for the candidate node does not match any of the routing information stored for the first plurality of nodes, wherein the routing information from the routing table that corresponds to the routing information stored for the candidate node remains in the routing table when the routing information stored for the candidate node matches the routing information stored for only one of the first plurality of nodes.

In some embodiments, further comprising adding routing information stored among nodes in the second hierarchy that do not match routing information in any nodes in the first hierarchy.

In some embodiments, wherein the comparing includes comparing weighting values in the routing information relating to unequal cost multipath (UCMP) routing.

In some embodiments, wherein the routing information in both the forwarding information base and the routing table are forwarding equivalence classes (FECs) data objects that classify multiprotocol label switching (MPLS) packets.

In some embodiments, wherein at least some of the FEC data objects in the forwarding information base refer to other FEC data objects in the forwarding information base, wherein at least some of the FEC data objects in the routing table refer to other FEC data objects in the routing table.

In some embodiments, wherein the FIB is stored in a memory in a data plane of the switch.

In some embodiments, wherein the routing table is stored in control plane of the switch.

In some embodiments, further comprising programming the forwarding information base with routing information from the routing table.

In some embodiments, further comprising performing the method subsequent a powering up of the switch.

In some embodiments, wherein the switch includes a programming agent configured to program the forwarding information base with routing information stored in the routing table.

In accordance with various embodiments, the present disclosure include a method comprising: building a first plurality of trees, the first plurality of trees representing hardware hierarchical forwarding equivalence class (HW FEC) information stored in a forwarding information base (FIB) in a circuit in a data plane of a switching device; building a second plurality of trees, the second plurality of trees representing hierarchical software forwarding equivalence class (SW FEC) information stored in a control plane of the switching device; upon determining a first SW FEC represented in the second plurality of trees matches one HW FEC represented in the first plurality of trees, associating the first SW FEC with the one HW FEC; upon discovering a second SW FEC represented in the second plurality of trees does not match any of the HW FECs represented in the first plurality of trees, programming the circuit to add a representation of the second SW FEC to the hierarchical HW FEC information stored in the FIB; and when there are HW FECs not associated with a SW FEC represented in the second plurality of trees, programming the circuit to remove representations of HW FECs not associated with a SW FEC.

In some embodiments, wherein the hierarchical HW FEC information associated with the circuit in the data plane and the hierarchical SW FEC information in the control plane are used for multi-protocol label switching (MPLS).

In some embodiments, further comprising: upon finding a third SW FEC represented in the second plurality of trees matches more than one HW FEC represented in the first plurality of trees: performing tie breaking to select a first hardware FEC from among the more than one HW FEC; associating the first hardware FEC with the third SW FEC.

In some embodiments, wherein: each one of at least one of the trees of the first plurality of trees includes a first root node, first child nodes, and a first plurality of edges, each first child node of the first child nodes being associated with a HW FEC represented in the first plurality of trees and having at least one respective first next route, and the first plurality of edges being coupled to the first root node and first child nodes according to the hierarchical FEC information associated with the circuit in the data plane; and each one of at least one of the trees of the second plurality of trees includes a second root node, second child nodes, and a second plurality of edges, each second child node of the second child nodes being associated with a SW FEC represented in the second plurality of trees and having at least one respective second next route, and the second plurality of edges being coupled to the second root node and second child nodes according to the hierarchical FEC information associated with the FIB in the control plane.

In some embodiments, wherein at least one of the determining and the discovering use: a first number of child nodes traversed from each HW FEC to a respective first child node furthest from a respective first root node in each tree of the first plurality of trees; and a second number of child nodes traversed from each SW FEC to a respective second child node furthest from a respective second root node in each tree of the second plurality of trees.

In some embodiments, wherein at least one of the determining and the discovering begins with a plurality of SW FECs having the second number of child nodes traversed equal to 0.

In some embodiments, wherein at least one of the determining and the discovering use: a first number of child nodes traversed from each HW FEC to a respective first root node in each tree of the first plurality of trees; and a second number of child nodes traversed from each SW FEC to a respective second root node in each tree of the second plurality of trees.

In some embodiments, wherein at least one of the determining and the discovering use a weighting associated with each first child node and each second child node, the weighting indicating a relative amount of network traffic to be sent using each HW FEC and each SW FEC.

In certain embodiments, the present disclosure includes a network switch comprising: a processor; and a memory coupled to the processor, the memory storing program code executable by the processor the perform a method, the method comprising: storing routing information in a forwarding information base (FIB) to a first hierarchy of nodes; storing routing information in a routing table separate from the routing table to a second hierarchy of nodes; comparing routing information stored in a candidate node in the first hierarchy of nodes with routing information stored among a first plurality of nodes in the second hierarchy of nodes having a height in the second hierarchy of nodes that is the same as a height of the candidate node in the first hierarchy nodes; and removing routing information from the FIB that corresponds to the routing information stored in the candidate node when the routing information stored in the candidate node does not match any of the routing information stored among the first plurality of nodes, wherein the routing information from the routing table that corresponds to the routing information stored in the candidate node remains in the routing table when the routing information stored in the candidate node matches the routing information in only one of the first plurality of nodes.

In some embodiments, wherein the method further comprises adding routing information stored among nodes in the second hierarchy that do not match routing information in any nodes in the first hierarchy.

What is claimed is:

1. A method in a switch comprising:
building a first plurality of trees, the first plurality of trees representing hierarchical hardware forwarding equivalence class (HW FEC) information stored in a forwarding information base (FIB) in a circuit in a data plane of a switching device;
building a second plurality of trees, the second plurality of trees representing hierarchical software forwarding equivalence class (SW FEC) information stored in a control plane of the switching device;
determining a match between a first SW FEC represented in the second plurality of trees and one HW FEC represented in the first plurality of trees, wherein a match is determined when the first SW FEC and the one HW FEC have two or more of the following the same: root node, height, number of parent nodes, and distance from respective root nodes;
programming the circuit to add a representation of a second SW FEC to the hierarchical HW FEC information stored in the FIB, the second SW FEC being represented in the second plurality of trees and not being matched with any of the HW FECs represented in the first plurality of trees; and
programming the circuit to remove representations of HW FECs not matched with any SW FEC represented in the second plurality of trees.

2. The method of claim 1, wherein the hierarchical HW FEC information associated with the circuit in the data plane and the hierarchical SW FEC information in the control plane are used for multi-protocol label switching (MPLS).

3. The method of claim 1 further comprising:
determining a tentative matches between a third SW FEC represented in the second plurality of trees and more than one HW FEC represented in the first plurality of trees; and
performing tie breaking to select a first hardware FEC from among the more than one HW FEC to determine a match between the third SW FEC and the selected first hardware FEC.

4. The method of claim 1, wherein:
each one of at least one of the trees of the first plurality of trees includes a first root node, first child nodes, and a first plurality of edges,
each first child node of the first child nodes being associated with a HW FEC represented in the first plurality of trees and having at least one respective first next route, and
the first plurality of edges being coupled to the first root node and first child nodes according to the hierarchical HW FEC information associated with the circuit in the data plane; and
each one of at least one of the trees of the second plurality of trees includes a second root node, second child nodes, and a second plurality of edges,
each second child node of the second child nodes being associated with a SW FEC represented in the second plurality of trees and having at least one respective second next route, and
the second plurality of edges being coupled to the second root node and second child nodes according to the hierarchical SW FEC information associated with the FIB in the control plane.

5. The method of claim 4, wherein the determining the match is further based on:
a first number of child nodes traversed from each HW FEC to a respective first child node furthest from a respective first root node in each tree of the first plurality of trees; and
a second number of child nodes traversed from each SW FEC to a respective second child node furthest from a respective second root node in each tree of the second plurality of trees.

6. The method of claim 5, wherein the determining the match begins with a plurality of SW FECs having the second number of child nodes traversed equal to 0.

7. The method of claim 4, the determining the match is further based on:
a first number of child nodes traversed from each HW FEC to a respective first root node in each tree of the first plurality of trees; and
a second number of child nodes traversed from each SW FEC to a respective second root node in each tree of the second plurality of trees.

8. The method of claim 4, wherein the determining the match is further based on a weighting associated with each first child node and each second child node, the weighting indicating a relative amount of network traffic to be sent using each HW FEC and each SW FEC.

9. A method in a switch comprising:
storing routing information from a forwarding information base (FIB) in a first hierarchy of nodes;
storing routing information from a routing table separate from the FIB in a second hierarchy of nodes;
determining a match between a candidate node in the first hierarchy of nodes and a node in the second hierarchy of nodes, wherein the match is determined when the candidate node and the node have two or more of the following: the same root node, the same height, the same number of parent nodes, and the same distance from respective root nodes; and
removing routing information, corresponding to the candidate node, from the FIB, when the candidate node does not match any node in the second hierarchy of nodes, wherein the routing information corresponding to the candidate node remains in the routing table when the candidate node matches only one node in the second hierarchy of nodes.

10. The method of claim 9, further comprising adding routing information stored for nodes in the second hierarchy that do not match routing information in any nodes in the first hierarchy.

11. The method of claim 9, wherein the determining the match is further based on weighting values in the routing information relating to unequal cost multipath (UCMP) routing.

12. The method of claim 9, wherein the routing information in both the forwarding information base and the routing table are forwarding equivalence classes (FECs) data objects that classify multiprotocol label switching (MPLS) packets.

13. The method of claim 12, wherein at least some of the FEC data objects in the forwarding information base refer to other FEC data objects in the forwarding information base, wherein at least some of the FEC data objects in the routing table refer to other FEC data objects in the routing table.

14. The method of claim 9, wherein the FIB is stored in a memory in a data plane of the switch.

15. The method of claim 9, wherein the routing table is stored in control plane of the switch.

16. The method of claim 9, further comprising programming the FIB with routing information from the routing table.

17. The method of claim 9, further comprising performing the method subsequent to a powering up of the switch.

18. The method of claim 9, wherein the switch includes a programming agent configured to program the FIB with routing information stored in the routing table.

19. A network switch comprising:
- a processor; and
- a memory coupled to the processor, the memory storing program code executable by the processor the perform a method, the method comprising:
- storing routing information from a forwarding information base (FIB) in a first hierarchy of nodes;
- storing routing information from a routing table separate from the routing table in a second hierarchy of nodes;
- determining a match between a candidate node in the first hierarchy of nodes and a node in the second hierarchy of nodes, wherein the match is determined when the candidate node and the node have two or more of the following: the same root node, the same height, the same number of parent nodes, and the same distance from respective root nodes; and
- removing routing information, corresponding to the candidate node, from the FIB, when the candidate node does not match any node in the second hierarchy of nodes, wherein the routing information corresponding to the candidate node remains in the routing table when the candidate node matches only one node in the second hierarchy of nodes.

20. The system of claim 19, wherein the method further comprises:
- adding routing information stored among nodes in the second hierarchy that do not match routing information in any nodes in the first hierarchy.

* * * * *